Oct. 7, 1941.    J. W. BRYCE    2,258,106
APPARATUS FOR PREPARING STATISTICAL RECORDS
Original Filed May 27, 1937    5 Sheets-Sheet 1
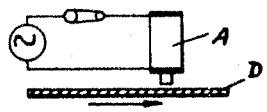
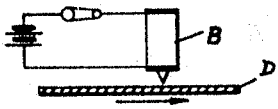
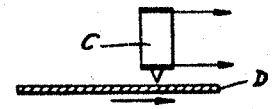
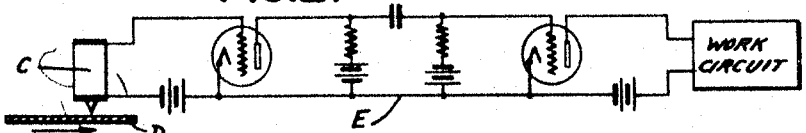
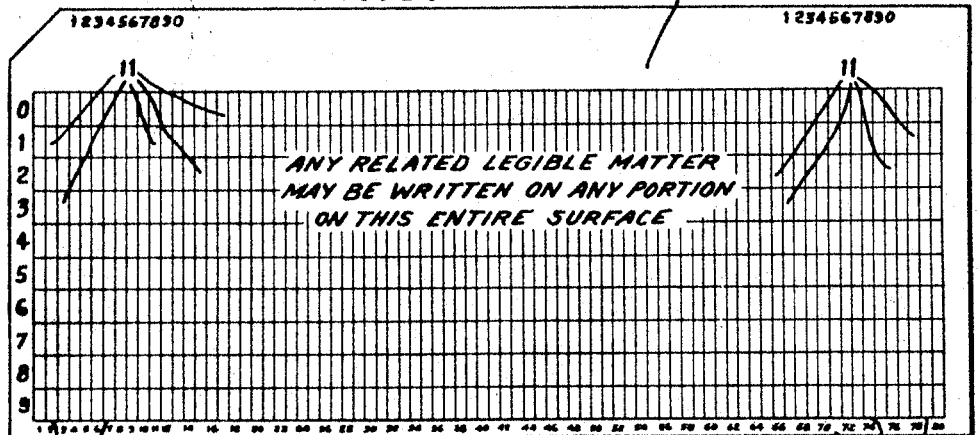
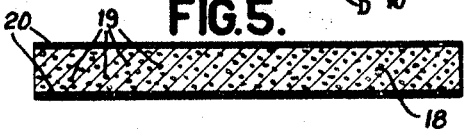
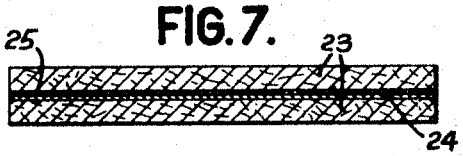
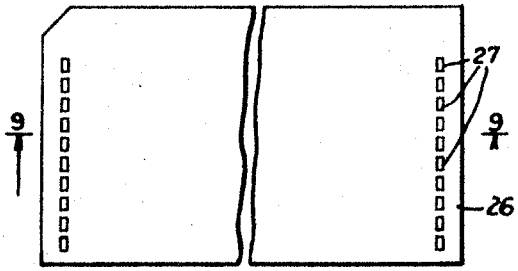
INVENTOR
James W. Bryce
ATTORNEY Oct. 7, 1941.  J. W. BRYCE  2,258,106
APPARATUS FOR PREPARING STATISTICAL RECORDS
Original Filed May 27, 1937    5 Sheets-Sheet 2

INVENTOR
James W. Bryce
by W. M. M.
ATTORNEY

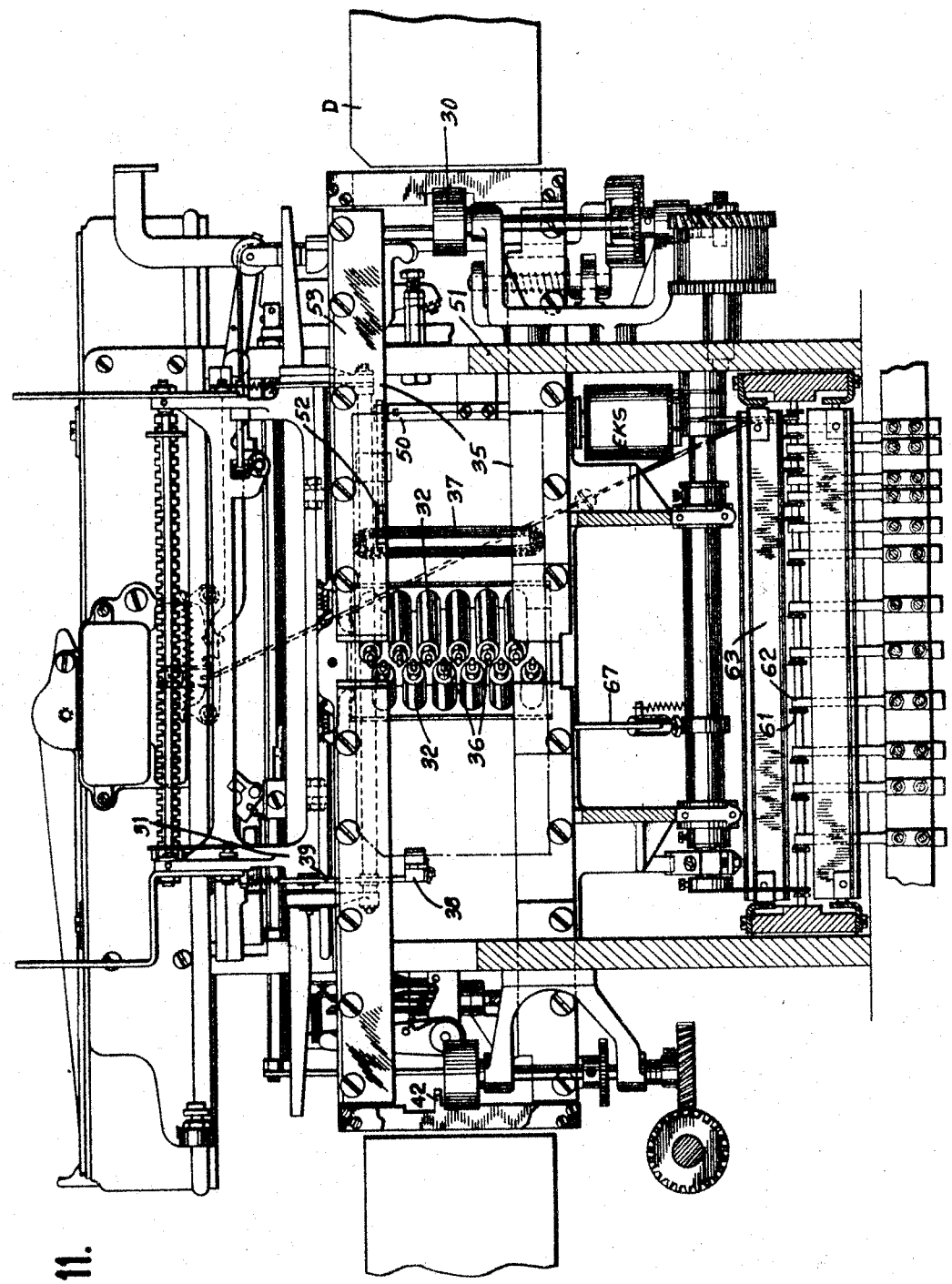

Patented Oct. 7, 1941

2,258,106

UNITED STATES PATENT OFFICE 2,258,106

APPARATUS FOR PREPARING STATISTICAL RECORDS

James W. Bryce, Glen Ridge, N. J., assignor to International Business Machines Corporation, New York, N. Y., a corporation of New York Original application May 27, 1937, Serial No. 145,031. Divided and this application June 17, 1938, Serial No. 214,401

5 Claims. (Cl. 234—1.5)

This invention relates broadly to accounting systems and the present case constitutes a divisional application of the copending application, Serial No. 145,031, filed May 27, 1937.

The present application relates specifically to a system to prepare or condition the control elements or records which are to be utilized subsequently in various types of control systems. The conditioning of the control elements or records is effected by providing magnetic conditions representing various data thereon. The magnetic conditions are discretely disposed on the records and by their relative disposition thereon represent the various data. The control elements or records when thus conditioned are adapted to be presented to a machine to convert the magnetic conditions on the control elements into electrical currents or impulses to control the machine in accordance with the magnetic indications. The machine functions controlled in accordance with the coded magnetic representations on the records are fully described and shown in the above mentioned copending application.

An object is to provide means for conditioning the control elements by applying discrete magnetic conditions thereto at predetermined and different code or index point positions or areas on the elements to represent the various data desired to be recorded.

Another object is to provide means whereby the discrete magnetic conditions may be applied successively column by column to the control elements.

Another object is to provide means for automatically printing the corresponding characterizations on the control elements simultaneously with the conditioning of the control elements.

Another object is to provide means for completely obliterating the recorded data on the control elements and in the process of doing this magnetically conditioning or preparing the control elements for recording of new data.

Another object is to provide means whereby the obliterating and control element conditioning processes are applied to each of the control elements each time the control elements are presented to the machine for recording of data.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1A, 1B, and 1C show diagrammatically the obliterating, recording, and reading means for detecting magnetic conditions on a record.

Fig. 2 shows an amplifier system including magnetic reading means in the input circuit.

Fig. 3 shows a detailed view of a control element.

Figs. 4 to 9 show detail sections of different forms of control elements.

Fig. 11 shows a front section of the record preparing device.

INTRODUCTION

Figure 10:
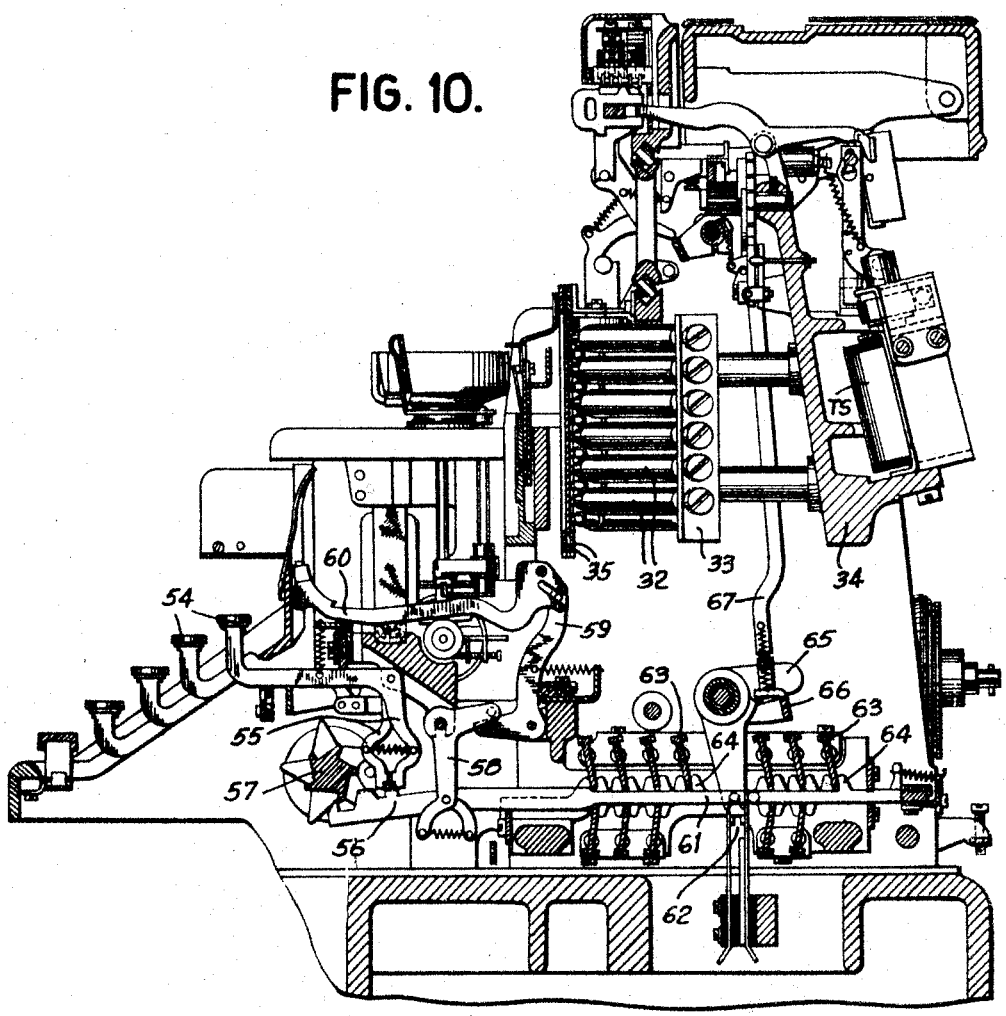
Fig. 10 shows a cross sectional view of the record preparing device.

Before describing the elements of the present system, it is believed advisable briefly to outline the theory of magnetic recording as applied to the control systems in the present invention.

The process of magnetically recording data in the form of discrete magnetic conditions or impressions depends essentially on the phenomenon of magnetic hysteresis and on the associated property that when changes of magnetomotive force are made upon a magnetizable substance a certain remanent flux density is retained by the magnetized substance which is termed "remanence." The intensity of the resultant field in the magnetizable substance depends precisely on the magnitude of the magnetic field acting thereon and the substance of the magnetizable element. The magnetizable substance of the control record for the present purposes should be chosen so that its retentivity characteristic is such that the remanent flux will be retained for an indefinite period of time.

The remanent flux densities retained by the control records may then be effective at a subsequent period to initiate electrical current conditions or impulses which are impressed upon various control circuits to control the operation of the different machines of the Hollerith accounting system.

In order to obliterate or efface the recordings on a control record in the form of magnetic impressions, so that new data may be impressed upon the said record, another property peculiar to magnetizable substances is depended upon, namely, that the conditioned control records are presented to and influenced by an alternating magnetic field of suitable intensity so that not only are the discrete magnetic impressions on the records obliterated but the magnetizable substances of the records are restored to a non-magnetized state so that the remanent flux density throughout the record is reduced to zero value.

It is evident then from the statements just set forth that if the non-magnetized records are subjected to a constant magnetic field so as to impress discrete magnetic impressions thereon, such impressions may be retained thereon for any desired period and that the control records may be employed in that state to control selectively the various accounting machines, and that at any subsequent desired period the recordings may be obliterated without impairing the utility of the control records so as to be in a state or condition so that new magnetic influences may be impressed thereon to represent new characterizations of the desired data.

Referring now to Figs. 1A, 1B, and 1C of the drawings, the method of preparing and utilizing the control records is shown diagrammatically. The first step is to present the control record D to a changing magnetic field created by the magnet A, termed the obliterating magnet. It is preferred in the present case to subject all the record elements to the magnetic field of the obliterating magnet before the data is recorded or impressed thereon; in this manner, it is assured that the magnetizable substances of the elements are restored to a normal, non-magnetized condition. The second step is then to present the control record D to one of the recording magnets B of the record preparing device. It will be described later herein that the record preparing or conditioning device is provided with a plurality of magnets positioned at definite index point positions or areas and that the definite portions of the control record are presented to the recording magnets, so that a selected magnet, upon energization thereof, is effective to create a constant magnetic field which is directed to a particular control area on the record so as to excite the selected or desired identifying area and thus impress thereupon or therein magnetic impressions or influences which are retained by the record.

One of the recording magnets B is shown disposed in close proximity to the record so that a particular identifying area thereof is subjected to the excitation field of the particular recording magnet and thereby impressing upon the record a discrete magnetic impression. Upon removal of the record D from the constant excitation field created by the recording magnet, the control record will retain a certain remanent magnetization, the value of which depends on the magnitude of the magnetic field acting upon the record.

The disposition of the discrete magnetic impression on the record is indicative of a certain characterization of the data desired to be recorded. A plurality of such discrete magnetic impressions may be disposed in a number of various identifying areas to represent various characterizations. It is preferred to arrange the different control or magnetizable areas in columnar arrangement so that each column may be conditioned by magnetic impressions differently positioned in the individual columns. It will be shown hereinafter how the various columnar areas may be prepared either successively column by column.

In order to explain the utilization of the records prepared in the manner just described, it is necessary to describe the associated elements adapted to detect the magnetic impressions representing the recorded data, convert the said differentially disposed and discrete magnetic impressions into electrical impulses, and direct the differentially timed impulses by various control circuits to control devices adapted to translate and interpret the various characterizations impressed on the control records. The specific control devices are described in detail in the aforementioned copending application and will not be repeated herein, but a brief description of the method of converting the magnetic influences to electrical currents will be set forth.

Referring now to Figs. 1C and 2, the conditioned control record D is presented to one of the electromagnets C which will be termed a reading or sensing magnet. As the record is presented to the magnet C and upon detection of a magnetic impression, the remanent flux of the impression is effective to induce a flow of electric current in the magnet coil itself and the associated circuit. The value of the induced current in the magnet coil depends upon the intensity of the remanence of the magnetic impression and the direction of the current flow depends upon direction of the magnetic field impressing the magnetic influence on the record. The flow of current induced in the magnet coil is then conducted to the input circuit of an amplifying system, generally designated at E, and comprises a plurality of thermionic devices of which two are shown connected in cascade employing the resistance coupling type of connection which is well known and need not be described in further detail. The grid circuits of the devices are maintained at a suitable negative bias, and indicated as such by the conventional battery, so that normally no current flows in the output circuit of the system and accordingly the associated work circuit remains normally deenergized. The flow of current induced in the reading magnet coil and impressed upon the input circuit of the amplifier is of such value so as to reduce the grid bias and thus permit the devices to operate so that the current flow in the output circuit thereof is effective to energize the work circuit.

The work circuit is deenergized immediately when the sensed magnetic impression is positioned away from the reading magnet. In this manner, it is possible to convert the discrete magnetic impressions into distinct current impulses, and depending upon the disposition of the magnetic impressions, the current impulses are created or initiated, as the record is presented to the reading magnet, at various and different times or time intervals.

The specific details of control records suitably adapted for the reception of discrete magnetic impressions representing the data desired to be recorded will now be described. In order to simplify the following description as much as possible, the principle of the present invention will be applied to various elements which are standard and used at present in the known accounting systems.

Control records

The control records to be described and shown in Figs. 3 to 9 must fulfill certain requirements in order to be adaptable to accounting system processes. The records, of course, must comprise suitable magnetizable substances which, when subjected to controlling magnetic fields and removed therefrom, retain suitable remanent fluxes therein which will be effective to create or initiate current impulses when presented to suitable detecting or sensing devices.

The magnetizable material may be incorporated in or form part of the control record in various ways, for example, (1) the said material may be in the form of a metallic wafer or strip, or individual wafers or strips; (2) or may be in the form of metal powder or filings suitably fixed upon a carrier or base; (3) or a form of colloidal metal and sprayed or coated upon a carrier or base as a metallic coating; (4) or a form of coating or layer of material deposited on a carrier by an electrolytic process; (5) or may be in the form of a granular material such as filings and mixed in suitable paper used as a carrier; (6) or a form of finely divided metal powder incorporated in the pulp before manufacturing the paper carrier or base.

Irrespective of the method employed to form the control records, it is imperative that the records produced be capable of withstanding the stresses to which they are subjected by the rapid and repeated handling of the records in the various accounting machines. It is necessary that the records have sufficient rigidity and durability to be adapted for and capable of being electromechanically segregated, sorted and tabulated and withstand the exigencies of repeated operations.

It is also necessary to form the control records so as to be provided with at least one surface to readily receive legible matter such as various characters or marks formed by writing, printing, or typewriting. This requisite is quite important in view of the fact that the magnetic influences impressed on the control records are not visually discernible and therefore the appearance and configuration of the control records remain unchanged; that is, the records appear exactly the same after recording the data thereon as they appeared before recording of the data was effected. In this manner, it is possible to identify the various discrete magnetic influences impressed on the records. Not only is it possible to identify the various recordings by the corresponding characters written or printed on the surface of the records, but also the entire surface, or any part thereof, is free to be used for reception of additional data which it might be desired to include thereon. The latter feature is possible since the surface of the record is not altered or mutilated for the purpose of recording the particular data.

It is evident, too, that subsequent entries of the legible characters may be made upon the surface of the record from time to time. This makes it possible to delete or strike out any of the printed or written characters as desired or add thereto, particularly in view of the fact that the magnetic influences impressed on the records may be obliterated and substituted by new recordings from time to time. Sufficient space on the surface of the card should be available to receive the additional printed or written recording identifying matter in the event it is desired merely to strike out the irrelevant legible matter.

With reference now to the figures, particularly Fig. 3, the control record D represents, in the present instance, a control element of standard size, that is, similar in size to the records for use with accounting machines of the well known Hollerith type, and comprising magnetizable material and having a surface capable of receiving legible characterizations.

The surface of the control record D in the figure is shown to be divided into a plurality of individual index point positions. In practice, it is to be understood that the index point positions need not be indicated as shown in the figure and that the illustration used is merely for descriptive purposes, since it is impossible to show graphically the magnetic influences impressed in the various control areas.

It is seen that a plurality of columnar areas 10 are provided along the minor axis of the control record D and that each columnar area is subdivided into a plurality of code or index point positions 11, each position representing a certain value or characterization. For example, each columnar area, as shown, is divided into ten positions, the values of which increase in value from the top to the bottom of the record. In this respect, the positions are arranged and identified similarly as is the customary and well known arrangement of the Hollerith record. It is to the specific positions 11 where the discrete magnetic influences are directed and impressed in accordance with the data desired to be recorded.

It is evident, therefore, that the statistical information or data are arranged in the form of arbitrary indications coded according to their positions on the record.

The magnetic material may be in a form or state that it will not readily receive writing or printing, and it is obvious that such a surface must be provided so as to enable the identification of the records and interpretation of the data impressed thereon. The term "writing surface" is meant to include a surface which will readily take impressions from a pencil, pen, typewriter, hand stamp, printing press, or other kindred instrument. In Fig. 3, the entire plan surface of the control record is adapted to be capable of receiving such legible impressions, and, as indicated on the record, the legible indications may be arranged at the head of the columns to interpret the code impressions in the corresponding columns. In addition to the columnar code indications, the remaining surface of the record is available and capable of receiving legible impressions, since the magnetic influences impressed on the record in the various positions do not alter the configuration of the record, and the legible impressions in no way disturb or alter the effects of the magnetic impressions.

It should be mentioned at this time, that in addition to the different positions 11, a space 12 is provided available for the reception of additional magnetic impressions which can be used for various control purposes or in combination with the impressions disposed in the positions 11 to expand the number of code combinations on the records. It is well known that for certain control purposes "11" and "12" index point positions are provided on a control record and in such cases where this is desirable it is possible to impress the discrete magnetic influences to be utilized for control purposes in the "11" and "12" positions for any columnar area 10, in the space 12 designated on the record in the figure.

Referring now to Figs. 4 to 9, different forms of control records comprising magnetizable material will be described, and it is to be understood that each record described hereinbelow can be conditioned in the manner just described and the arrangement of the magnetic influences and legible impressions can be made in accordance with the description set forth in conjunction with the record D in Fig. 3.

In Fig. 4, the record is shown to comprise a carrier or base 13 which may be of paper stock prepared from coniferous chemical pulp free from ground wood, although other material, preferably non-magnetic, may be used as a support or backing as long as it is strong and durable and capable of withstanding the stresses to which it is subjected. A wafer or foil of magnetic material 14 is shown secured to the carrier 13 by any suitable bond or cementitious material 15, such as glue. In order to protect the foil or wafer of magnetic material, and also to provide a writing surface for the record, a layer of suitable paper 16, such as mentioned hereinbefore, is provided and secured to the magnetic wafer 14 by a layer of cementitious material 17.

It should be mentioned at this time that it has been found that magnetic lines of force, when suitable coils are used and the proper voltages are applied thereto (depending upon the materials used in the record), will travel through non-magnetic material and cementitious layers generally without hindrance or interruption.

Referring now to Fig. 5, a record is shown to comprise a sheet of suitable non-magnetic material 18 such as paper, which is impregnated with granular magnetic material, generally indicated at 19, such as iron filings. Or, if preferred, the carrier 18 may be made by depositing finely divided metal powder in the paper pulp so as to be incorporated therein before the manufacture of the magnetizable paper stock. The impregnated paper may then be treated and coated on both sides with layers of ink retaining varnish 20. The layers of varnish serve two purposes; (1) to protect the impregnated carrier 18, and (2) to provide a writing surface on the record.

In Fig. 6, the impregnated sheet 18 is shown to be covered with layers of suitable plain paper stock 21 secured to the impregnated stock by cementitious material 22. One of said layers of plain stock 21 should be capable of receiving printing or legible character marks.

In Fig. 7, one of the plies of paper stock 23 is coated with a metallic coating 24 and secured to the other by cementitious material 25. To this end, suitable metal powder or filings may be suspended in any suitable binder and sprayed or coated on one of the plies of paper stock. Colloidal iron may be used and sprayed thereon as a metallic coating.

In Figs. 8 and 9, still another modification is shown to comprise two plies of suitable paper stock 26 having discrete magnetizable portions 27, at all the index point positions, formed on one of the said plies of paper stock. These portions may be coated on the paper stock similarly to the coating 24 described in conjunction with Fig. 7. A stencil plate may be used to cover the paper stock when the coating of the magnetizable material is to be applied thereto, or the portions 27 may be printed thereon similarly as ordinary printed matter. The magnetizable portions are positioned to correspond to the positioning of the index point positions 11 (Fig. 3). The plies of stock 26 are then secured by the cementitious material 28.

It has been determined, by experiment, that in cases where homogeneous magnetizable materials are used in control records of the character described (with the exception of the type shown in Figs. 8 and 9), the magnetized index points or marks cannot be recorded as closely as when powdered or granular magnetizable materials are used. For this reason the last mentioned types of materials are preferred.

It is seen from the foregoing description how control records suitable for use in present day accounting systems can be formed, said records having suitable characteristics such as rigidity, durability, etc. in order to render them capable of being electro-mechanically segregated, sorted, and tabulated; said records comprising (1) suitable magnetizable material so that magnetic influences directed to certain index point positions thereof are retained by the records, and (2) that a suitable writing surface is provided on the records, the entire surface of which may be utilized for the reception of the legible characterizations.

Record preparing devices

The method of preparing and conditioning the accounting control records will now be described. The purpose of the record preparing devices was mentioned hereinbefore, namely, (1) to condition the magnetic record so as to be assured that the magnetizable material is restored to a non-magnetic state. It is immaterial whether or not the record as presented to the devices retains magnetic influences thereon which may be indicative of previously recorded data; (2) to impress upon the conditioned or non-magnetized record, new recordings of data in the form of discrete magnetic influences which are disposed in the different control areas of the records; (3) to print automatically the corresponding characters or marks on the writing surfaces of the records so as to enable the identification and interpretation of the coded magnetic influences. This feature is quite important, not necessarily the simultaneous printing of the corresponding identifying characters on the writing surfaces of the records, but the provision of writing surfaces thereon so that it is possible to record by hand or automatically the legible character marks on the records. Otherwise, it would be difficult to differentiate between a recorded control element and a non-recorded or blank element. This is due to the fact that the magnetic influences impressed on the record are invisible and cannot be physically discerned as far as the naked eye is concerned.

Referring now to Figs. 10 and 11, one type of record preparing device is shown and is similar in some respects to the record preparing device shown and described in detail in the U. S. Patent No. 2,046,082, issued June 30, 1936. Magnetic impression creating means are provided to effect recording of the data on the magnetizable records. The means for presenting the record to the machine and ejecting it therefrom are shown in detail in the said patent. For this reason, the following brief description is deemed to be sufficient to understand the operation of the present record preparing device.

Any form of the records comprising magnetizable material with a suitable writing surface described hereinabove may be used, and is presented to the device, as shown in Fig. 11 by a suitable record picker mechanism described in detail in the said patent, enabling the feed roller 30 to position the record to the first column position where the record carriage 31 then assumes control of the movement of the record from right to left.

Recording magnets 32 of which twelve are provided are suitably mounted on base 33 which in turn is supported by the frame 34 of the device. The magnets are mounted to the rear of but in close proximity to the card guiding member 35. It is noted that the magnets are mounted in a staggered arrangement, the reason for which is to provide correct spacing between the individual cores 36 which must correspond to the spacing of the individual index point positions of the record in each columnar area. The magnets are positioned so that when the record D is presented to the device and the carriage 31 assumes control thereof, the first column of the record is presented to the recording magnets.

Disposed to the rear of the carriage and ahead of the recording magnets is shown an obliterating magnet 37 extending across the entire width of the record. This magnet is suitably secured to the framework of the machine, and is controlled by the contacts 50 mounted on the frame 51. The contacts are operated by a control lever 52 suitably mounted on the guide member 53 of guide frame 35 and is operated by the record as it is positioned past the lever. Due to the provision of the magnet 37 in the position shown, a change in the type of card fingers provided is necessary. The preferred changes shown are to provide but one card gripper 38 mounted to the usual reciprocating arm 39. The arm 39, as is well known, is swung out of the path of the record during an eject cycle and restored into the path of the record when a new record is fed to the machine to position the record securely in the carriage.

Figure 12:
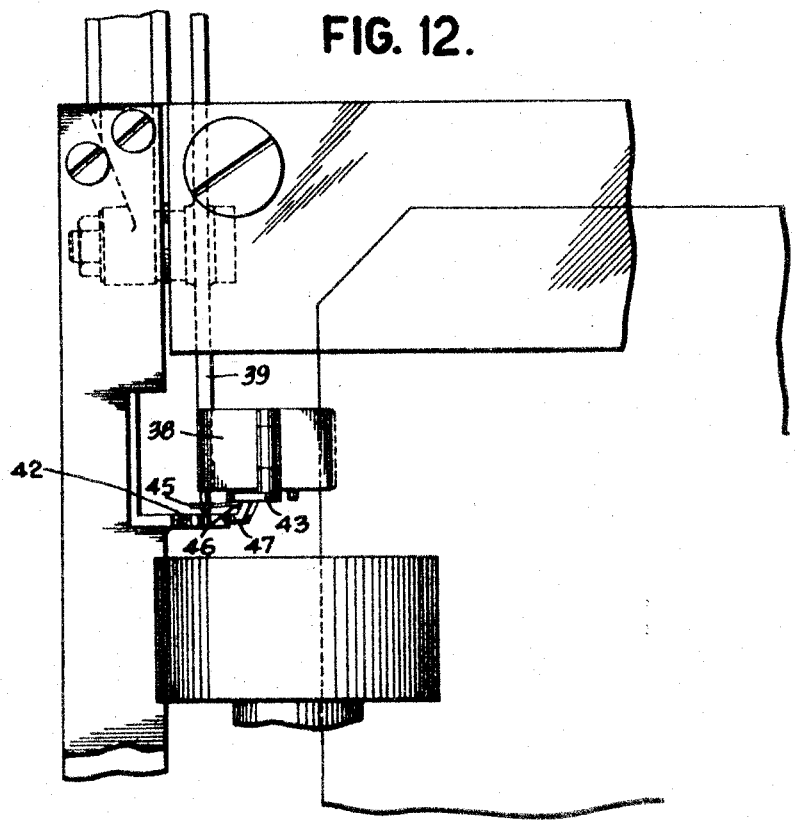
Figure 13:
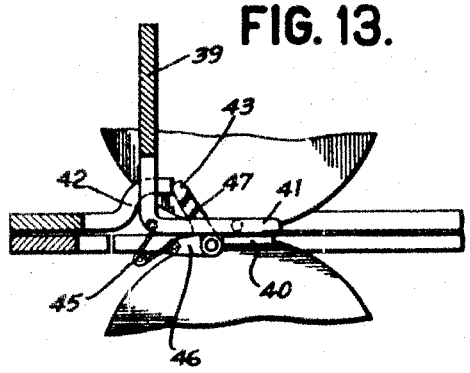

In the present case, the gripper 38 not only engages the record when fed to the carriage, but actually grips it to position it in accordance with the movement of the carriage. Referring now to Figs. 12 to 15, different operating positions of the gripper will be described. Let it be assumed that the carriage and record are in the last column position as shown in Figs. 12 and 13, the gripper finger 40 is shown in an operated position to engage the record and grip it securely due to the exerted pressure by the finger 40 against the card and member 41 which is secured to the arm 39. In Fig. 13 it is seen that a fixed stop 42 is just ready to pivot the arm 43 which may be integral with the finger 40 by means of the member 47 secured to arm 43.

Figure 15:
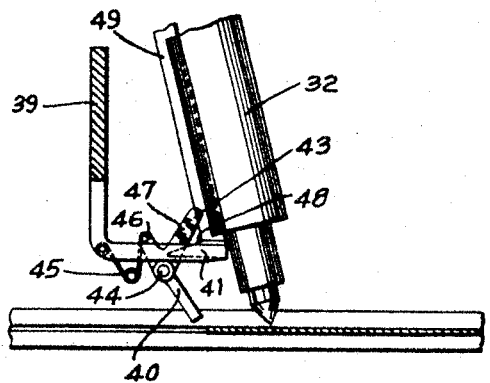
Figs. 12 to 15 show different operating positions of the record gripper.
Figure 14:
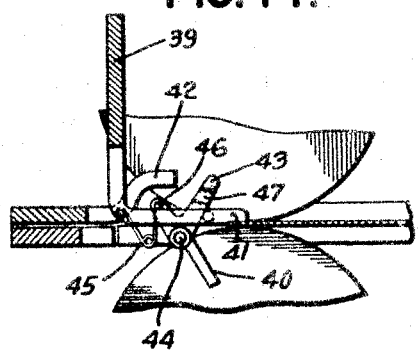

When the record and carriage are positioned beyond the last column position, the finger 43 is positioned to the right (Fig. 14) about the pivot 44 to cause the gripper finger 40 to release the record. The toggle spring 45 secured to member 41 and extension arm 46 maintains the finger 40 in either operated position. The finger releases the record just before the arm 39 is positioned out of the path of the record so that the record may be ejected in the usual manner. Upon automatic return of the carriage 31 the arm 39 is again restored to its position as shown in Figs. 12 to 14, namely, in the path of the record so as to enable the gripper to engage the record. Fig. 15 shows the arm 39 in a position before it has been restored to the normal record position. As the arm 39 is moved downwardly, as viewed in Fig. 15, the offset member 47 engages the camming surface 48 fixed on arm 49 which is suitably secured to the magnet base 33 (Fig. 10). As the arm 39 is positioned farther in this direction, the camming surface is effective to cause the fingers 43 and 40 to be pivoted so as to engage the record just as the arm 39 is completely positioned in the path of the record. Then as the carriage is permitted to escape the record is positioned in accordance therewith by means of the record gripper just explained. It is obvious that many other well known toggle arrangements may be substituted for the one form just described to grip and release the record upon positioning of the arm 39.

The mechanism to control the printing and recording operations after a record is positioned in and under control of the carriage will now be explained. Operation of any one of the keys 54 causes the arms 55 to be operated thereby permitting the lever 56 to be released. The hooked extremity of lever 56 is then adapted to engage one of the ribs of the continuously rotated actuators 57 to be operated thereby. Operation of the lever 56 causes it to be positioned to the left as viewed in Fig. 10, operating the bell crank lever 58, lever 59, and type bar 60 to effect printing of a character on the record corresponding to the key 54 selected and depressed. Actuation of the lever 56 also causes the corresponding bar 61 to be positioned to the left to effect two operations; (1) to operate the associated contacts 62 suitably mounted in the device, said contacts controlling the associated recording magnet 32, and (2) to rock a corresponding bar 63 by means of the differently positioned lugs 64 on the bars 61. The rocking of a bar 63 is effective to cause the corresponding bell crank lever 65 to be rotated in a clockwise direction and engage the common bail 66, depressing said bail which is associated with the carriage escapement control lever 67.

Therefore, it is seen that upon depression of a selected key bar, character printing, record conditioning and carriage escapement operations are effected.

Figure 16:
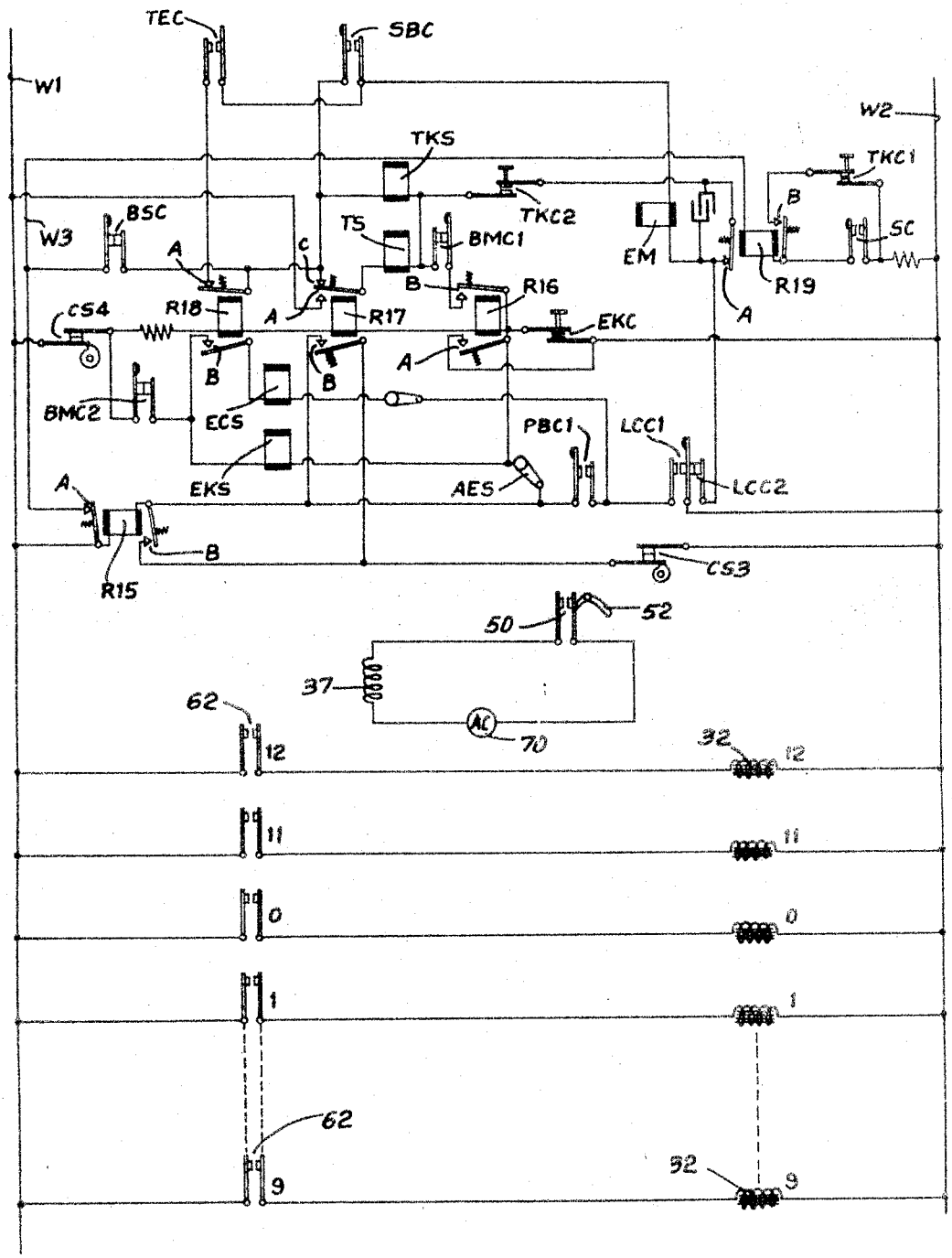
Fig. 16 shows a circuit diagram of the controlling circuits for the device shown in Figs. 10 and 11.

Referring now to the circuit diagram shown in Fig. 16 and corresponding in part to the circuit diagram of the said patent, certain of the important control circuits will be traced. Let it be assumed that the record carriage 31 is in its extreme right hand position and that no record is presented thereto.

In order to obtain a record in a recording position, it is necessary to initiate an eject cycle by depressing an eject key provided on the keyboard which is effective to operate and close the eject key contacts EKC. Closure of the said contacts establishes a circuit from one side of the line W1 through contacts CS4, coils of the relays R18, R17, R16 and the eject key contacts EKC to the other side of the line W2, operating said relays. A holding circuit for the relays is established through the contacts A of relay R—16, thereby shunting the EKC contacts. Closure of the contacts EKC is also effective to energize the relay R—15 from line W1 through the relay coil, switch AES and contacts EKC to the line W2. Contacts B of the said relay establish a holding circuit for the relay through cam contacts CS3.

Through the contacts A of relay R—17 the line W1 is connected to the tabulating solenoid TS, the circuit being completed through contacts BMC1, contacts B of relay R—16 and contacts A of the same relay to the line W2, energizing the tabulating solenoid. Operation of the tabulating solenoid permits the record carriage to move completely to the left of the last column position, thereby closing the LCC1 contacts and opening the LCC2 contacts. Further positioning of the carriage is effected by operation of the eject clutch solenoid ECS; the circuit initiating the eject cycle is as follows: the line W1, cam contacts CS4, contacts BMC2, eject clutch solenoid ECS, and contacts LCC1 to the line W2.

During the eject cycle the record gripper 38 is moved rearwardly and the record eject mechanism is operated to be effective to remove a record from the carriage whenever present. The carriage return mechanism is also operated during this cycle to return the carriage to the extreme right hand position. Near the middle of the cycle, while the carriage is returning the record picker mechanism is operated to initiate the feeding of a record towards the feed roller mechanism 30 (Fig. 11) to continue feeding the record into the guide frame 35.

When the eject cycle is completed, the record carriage will occupy the column 1 position with a record positioned thereon and under the control of the record gripper 38 which will then position the record in accordance with the carriage movement. The various relays operated during the eject cycle are restored to normal by opening of the cam operated contacts during the eject cycle. It is not deemed necessary to set forth the detailed timing at this time, for the reason that the operation and timing of the circuit operation is exactly as described in detail in the above mentioned patent.

It should be mentioned, however, that during the feeding operation of the record during the eject cycle, the record is positioned so as to engage the record controlled lever 52 to close the contacts 50; this operation is effected before the record is seized by the record gripper 38, and, of course, it is to be understood that the contacts 50 are operated as long as any portion of the record engages the control lever 52. The contacts 50 are effective to energize the obliterating magnet 37 by means of the comparatively high frequency AC source 70. As the individual portions of the record are presented to the obliterating magnet, the alternating magnetic field is effective to restore the magnetic material of the record to a non-magnetized state. It is seen therefore that whether or not the record retains previous recordings, the condition of the record is always restored to a normal non-magnetized condition before the recording of the new data is effected.

With the record now in column 1 position, operation of the keys 54 is effective to record the legible characters on the writing surface on the record, and due to the closure of the associated contacts 62, the corresponding recording magnets 32 are energized to create constant magnetic fields directed to the selected index point areas on the record in accordance with the selection of the keys 54. As the record is removed from the recording position the magnetizable material thereof retains the discrete magnetic impressions impressed upon the different control areas or fields of the record. Upon completion of the recording operation, the eject key is operated to eject the record, return the carriage mechanism to the extreme right hand position to pick up a new record which may then be conditioned as just explained.

It has been shown how to prepare any of the desired forms of the magnetic records described hereinabove; that is, (1) to obliterate all previous recordings on the record, and restore the record to a de-magnetized condition; (2) to impress new recordings upon the record in the form of differentially positioned discrete magnetic impressions, and (3) to print the characterizations upon the writing surface of the record to correspond to the coded magnetic influences impressed thereon.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. An apparatus for recording data designations at individual index point positions in different columns upon record elements comprising a recording station and a plurality of recording magnets thereat, one for each index point position in the said columns, means for feeding individual record elements to the recording station, said feeding means including intermittently operated means for presenting the individual columns of each record element successively to the recording station, and including additional means for holding the record element stationary while recording in the different columns presented to the recording station, said record elements including material capable of being magnetized and retaining individual magnetic designations, and means for selectively energizing the magnets momentarily at the times the record element is held stationary at the recording station in accordance with the data to be recorded to magnetize the record element at predetermined index point positions in different columns opposite the energized magnets thereby representing the data by the magnetic designations recorded on and retained by the record elements.

2. An apparatus for recording data designations at individual index point positions upon record elements comprising a recording station, means for feeding record elements to the recording station including means for holding the record elements stationary thereat during recording operations, said record elements including material capable of being magnetized and retaining individual magnetic designations, recording magnets, means for holding the magnets in fixed positions in close proximity to the record elements and in predetermined positions opposite the index point positions of the record elements, and means for energizing the magnets momentarily at the times the record elements are held stationary at the recording station in accordance with the data to be recorded to magnetize the record elements at index point positions opposite the energized magnets thereby representing the data by the magnetic designations recorded on and retained by the record elements.

3. The apparatus set forth in claim 2 in which an obliterating magnet is provided, and means for energizing the said magnet when each record element is fed to the recording station to obliterate any previous magnetic recording which might appear on the record elements before the said recording magnets are energized.

4. The apparatus set forth in claim 1 in which an obliterating magnet is provided, and means controlled by each record element for effecting the energization of the said magnet as the said record elements are fed to the recording station to obliterate any previous magnetic recording which might appear on the record elements before the said recording magnets are energized.

5. An apparatus for recording data designations at individual index point positions in different columnar areas upon individual record elements comprising a plurality of recording magnets, means for supporting the magnets and holding them in fixed columnar positions in close proximity to the record elements presented thereto, means for moving individual record elements successively past said magnets, each record element including material capable of being magnetized and retaining individual magnetic designations, intermittently operated control means for preventing any relative movement between each record element and magnets during recording operations, and means for energizing the magnets momentarily, at such times when there is no relative movement between the said element and magnets, in accordance with the data to be recorded to magnetize each record element at predetermined index point positions opposite the energized magnets thereby representing the data by the individual magnetic designations recorded on and retained by the record element.

JAMES W. BRYCE.